INVENTOR.
BY George A. Riley
Wooster, Davis & Cifelli
ATTORNEYS.

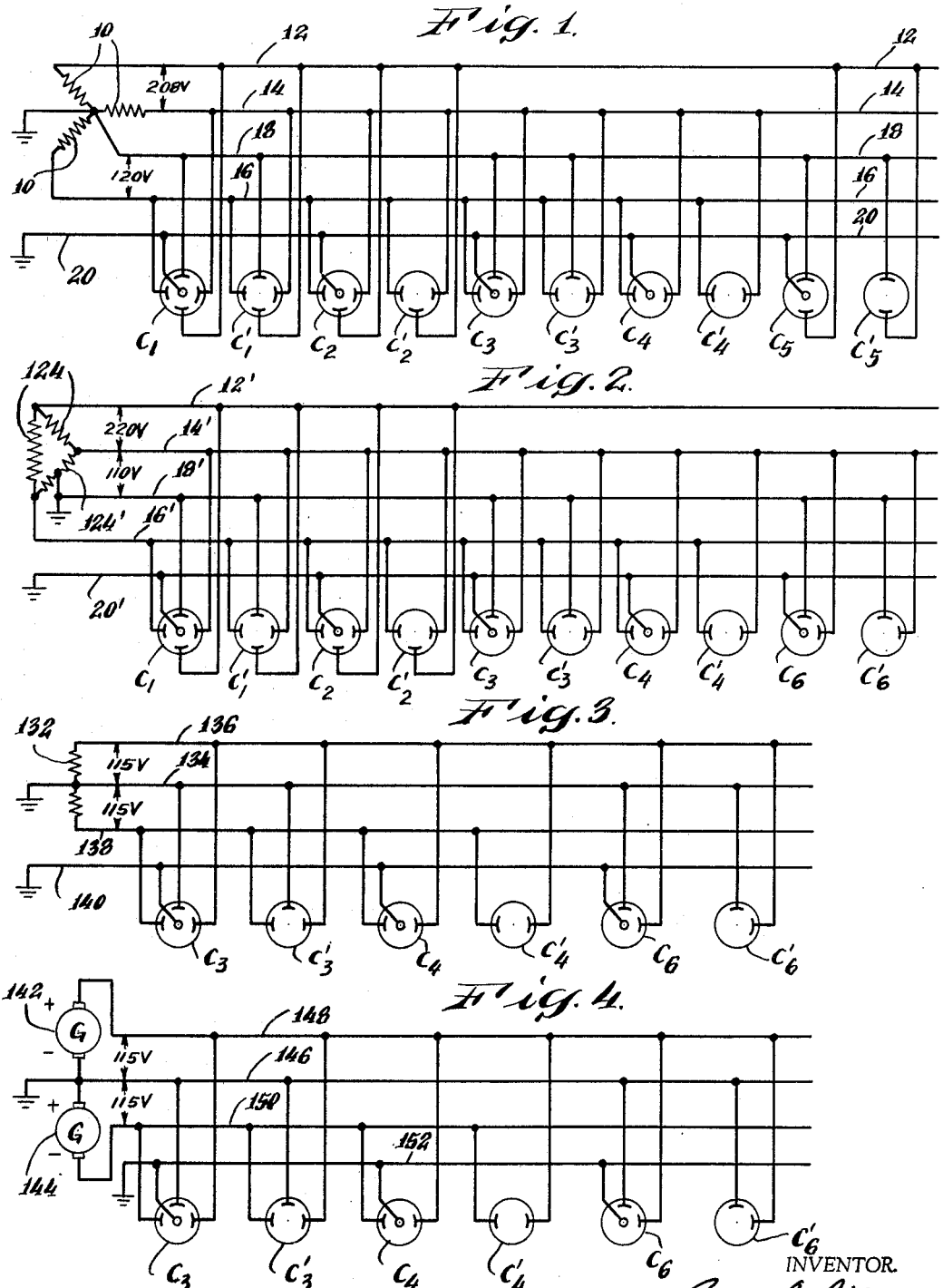

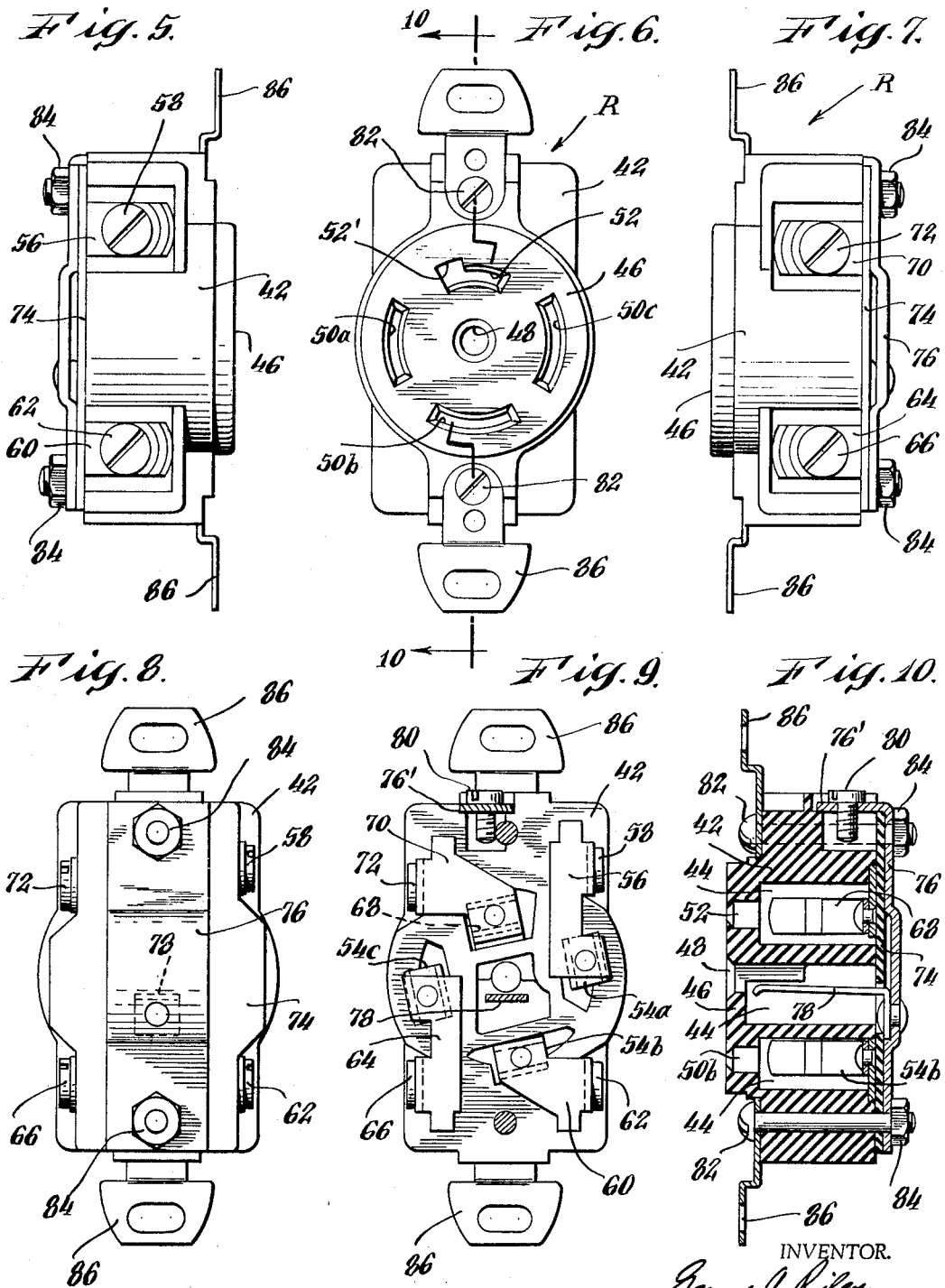

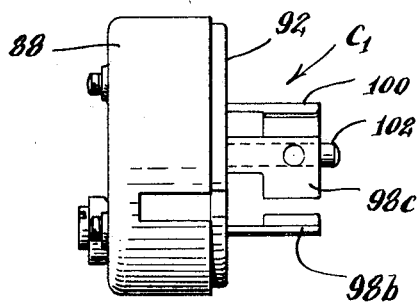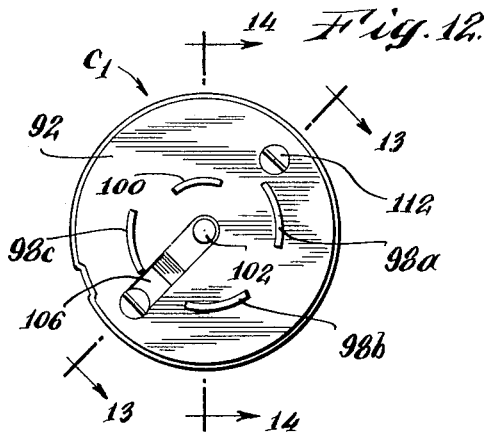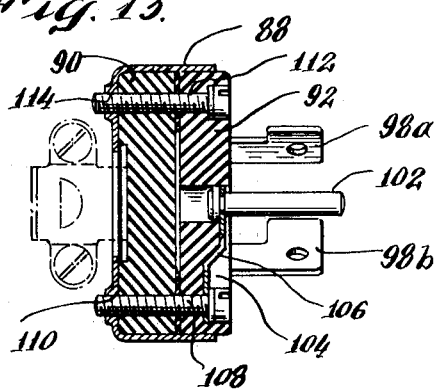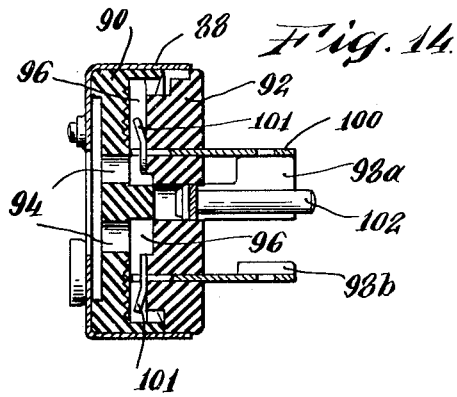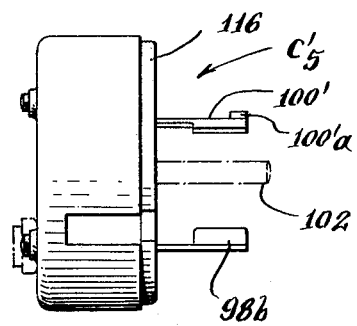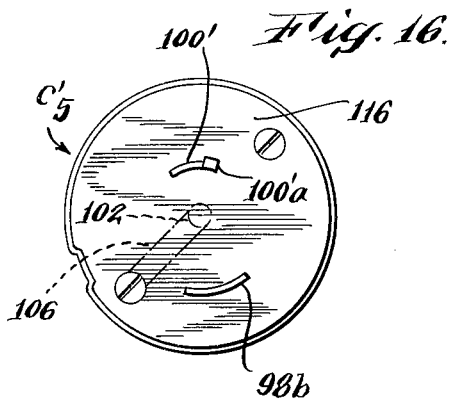

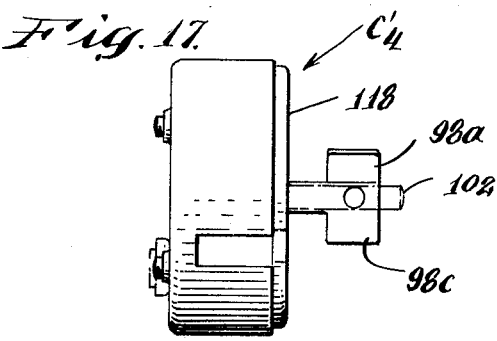
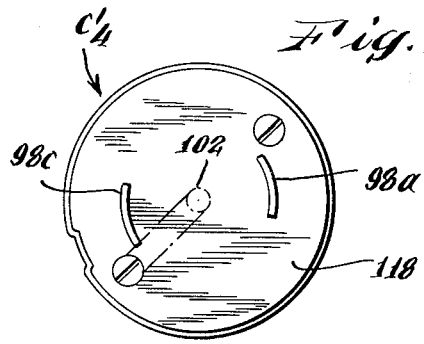
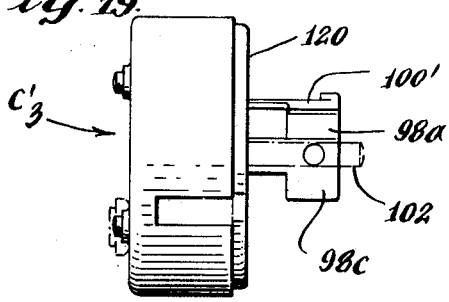
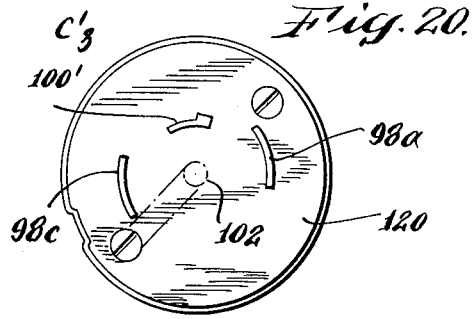
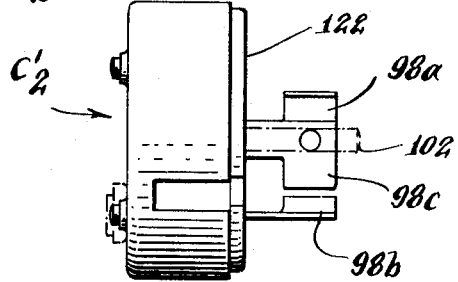
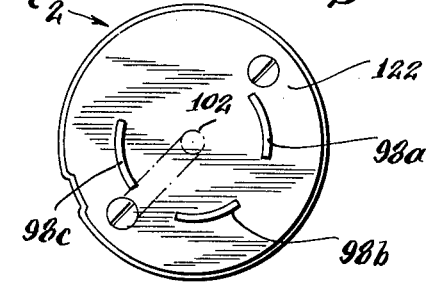
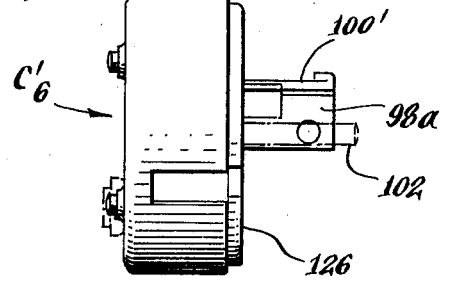
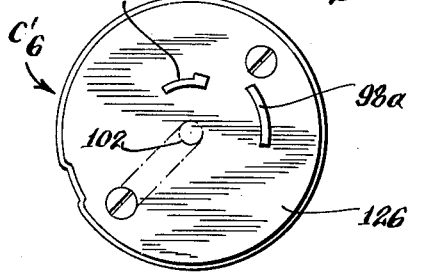
INVENTOR.
BY George A. Riley
Wooster, Davis & Cifelli
ATTORNEYS.

INVENTOR.
George A. Riley
BY Wooster, Davis & Cifelli
ATTORNEYS.

United States Patent Office 3,500,056
Patented Mar. 10, 1970

3,500,056
ELECTRICAL WIRING SYSTEM AND COMPONENTS THEREFOR
George Albert Riley, Bridgeport, Conn., assignor to Harvey Hubbell, Incorporated, Bridgeport, Conn., a corporation of Connecticut
Filed Apr. 27, 1965, Ser. No. 451,295
Int. Cl. H02j 3/00
U.S. Cl. 307—13                                       14 Claims

ABSTRACT OF THE DISCLOSURE

A multiple voltage wiring system wherein all receptacles in the system are substantially identical, each receptacle being wired to all conductors of the system. The connector caps which are wired to the loads differ in configuration to match the requirements of the load. Each cap can be inserted into any receptacle but only in a position determined by its configuration. This position determines the supply conductors to which the load is connected and thereby selects the proper voltage for the load.

---

This invention relates to electrical power distribution wiring systems and, more particularly, to such systems having greatly increased flexibility and versatility in use.

Multiple voltage power distribution wiring systems are in common usage, particularly in industrial and commercial establishments. In systems of this type, an entire industrial plant may be wired with a plurality of conductors fed from a power source, such as a bank of power distribution transformers. Any of several types of power distribution systems may be employed. For example, one of the most common at the present time is the 120/208-volt three-phase, four-wire system. In a system of this type, the secondaries of the distribution transformers are each rated at 120 volts and are arranged in three phase Y connection with a grounded neutral conductor. The four conductors, and an optional fifth grounding conductor, are led to a plurality of receptacles located throughout the plant. Each receptacle is wired to the proper conductors for the load to be supplied at the particular receptacle. For example, a receptacle in the form of a convenience outlet in an office might be wired to the system's conductors to supply 120 volts single phase power while a receptacle on a motor in the main plant might be wired to provide 208 volts, three phase power. Each of the receptacles which is connected in such a wiring system is carefully designed so that no interchangeability can occur between the electrical connector caps for the various receptacles. Thus the cap provided for an electric typewriter will have a configuration to fit only a receptacle wired for 120 volts single-phase power, and will not fit a receptacle wired for 208 volts three-phase power.

A number of other multivoltage power distribution systems are also employed in addition to the three phase, four wire, Y connection type described above. Examples of these are the delta connected three phase, the single phase AC Edison, and the DC Edison systems. Regardless of the type of system employed presently, they all have the common characteristic that a plurality of different receptacle types must be wired into the system in accordance with the power requirements of the loads to be supplied.

Accordingly, it is a primary object of the present invention to provide an improved multivoltage electrical power wiring system. Other objects are to provide such a system wherein a plurality of identical receptacles may be disposed throughout a plant and identically wired without regard to the individual loads being supplied; wherein all connector caps are interchangeably connectable to any receptacle, and wherein the proper voltage and phase power for a given load is automatically selected by its connector cap being attached to any receptacle.

The manner in which the foregoing objects are achieved will be more apparent from the following description, the appended claims and the figures of the attached drawings, wherein:

FIG. 1 is a schematic diagram showing the various connections which may be made to a three-phase five-wire wiring system;

FIG. 2 is a schematic diagram showing the various connections which may be made to another type of three-phase five-wire wiring system;

FIG. 3 is a schematic diagram showing the various connections which may be made to a single-phase four-wire wiring system;

FIG. 4 is a schematic wiring diagram showing the various connections which may be made to a DC four-wire wiring system;

FIG. 5 is a left-side elevational view of a receptacle usable with this invention;

FIG. 6 is a front elevational view of the receptacle of FIG. 5;

FIG. 7 is a right-side elevational view of the receptacle of FIG. 5;

FIG. 8 is a rear elevational view of the receptacle of FIG. 5;

FIG. 9 is a rear view, similar to FIG. 8, but showing the back plate of the receptacle removed;

FIG. 10 is a cross-sectional view taken substantially along the line 10—10 of FIG. 6;

FIG. 11 is a side elevational view of a connector cap usable with this invention;

FIG. 12 is an end elevational view of the cap of FIG. 11;

FIG. 13 is a cross-sectional view taken substantially along the line 13—13 of FIG. 12;

FIG. 14 is a cross-sectional view taken substantially along the line 14—14 of FIG. 12;

FIG. 15 is a side elevational view of another cap usable with this invention;

FIG. 16 is an end elevational view of the cap of FIG. 15;

FIG. 17 is a side elevational view of another cap usable with this invention;

FIG. 18 is an end elevational view of the cap of FIG. 17;

FIG. 19 is a side elevational view of another cap usable with this invention;

FIG. 20 is an end elevational view of the cap of FIG. 19;

FIG. 21 is a side elevational view of another cap usable with this invention;

FIG. 22 is an end elevational view of the cap of FIG. 21;

FIG. 23 is a side elevational view of another cap usable with this invention;

FIG. 24 is an end elevational view of the cap of FIG. 23;

Figure 25:
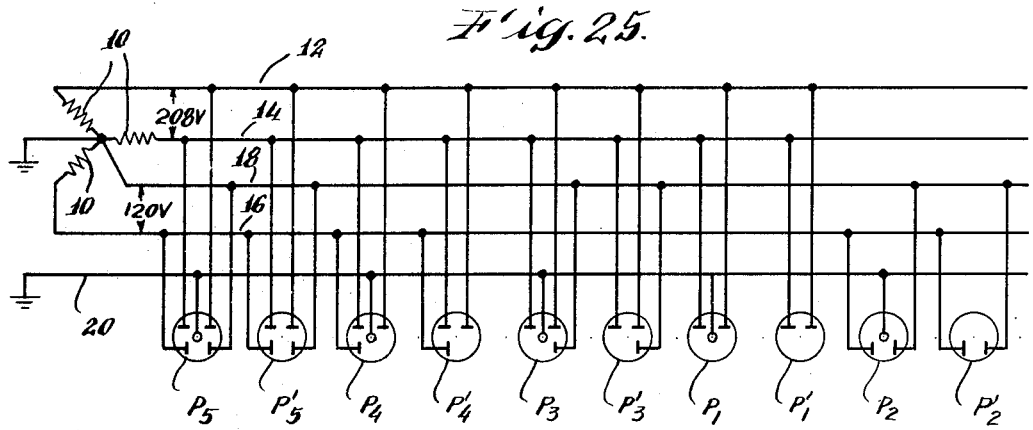
FIG. 25 is a schematic diagram of a three-phase five-wire Y-connected wiring system embodying a modification of this invention.

The objects of this invention are achieved in general by a wiring system wherein a plurality of substantially identical receptacles are provided through the system, a plurality of connector caps are interchangeably connectable to any receptacle, and the proper voltage and phase power is automatically selected by the connector cap and associated with each load.

FIG. 1 illustrates Y-connected three-phase electrical power distribution system. The system is supplied from three Y-connected transformer secondaries 10. These secondaries feed the three phase line conductors 12, 14, 16 which runs throughout the system, as do a grounded neutral conductor 18 and a separate grounding conductor 20. The single phase output of each secondary is 120 volts so that this voltage appears between the grounded neutral 18 and either of the line conductors 12, 14 or 16. 208 volts single phase output appears between any two line conductors 12, 14 or 16. There are also illustrated in FIG. 1 a plurality of configurations of receptacle contacts corresponding to connector caps, each connected in a different manner to the distribution system. Each of the connector caps is interlocking type having locking blades operable on turning relative to the receptacle and, where desired, a central grounding post. The various contact configurations for simplicity will be referred to the connector cap to which they correspond. Thus connector cap $C_1$ is illustrated as having its four concentric blades connected to the line conductors 12, 14, 16 and the grounded neutral conductor 18 to receive 208 volts, three phase power, while its central grounding post is connected to the ground conductor 20. Connector cap $C'_1$ is similar to cap $C_1$, but without the grounding pin. Cap $C_2$ is connected to the three line conductors to receive 208 volts, three phase power, and its central pin is connected to ground conductor 20. Cap $C'_2$ is similar to cap $C_2$, but without the grounding pin. Cap $C_3$ is connected to receive 120/208 volts, single phase and includes a central grounding pin. Cap $C'_3$ is similar to cap $C_3$, but without the grounding pin. Cap $C_4$ is connected for 208 volts, single phase, and has its grounding pin connected to conductor 20. Cap $C'_4$ is similar to cap $C_4$, but without the grounding pin. Cap $C_5$ is connected for 120 volts, single phase, with a grounding pin connection; and cap $C'_5$ is similar to cap $C_5$, but without the grounding pin. Referring back to the various connector cap configurations just described, it will be noted that each of the cap configurations is similar to cap $C_1$ but with one or more blades and/or grounding pin removed. This novel approach is one of the factors which make the present invention unique.

In accordance with one modification of this invention, a standard five wire receptacle is wired in a manner that a five wire cap, such as cap $C_1$, when inserted, will make the connection illustrated in FIG. 1. A plurality of additional connector caps is provided, each similar to the cap $C_1$ but having one or more of the blades and/or grounding pin omitted. The caps are polarized by their blade configurations in a known manner so that they may be inserted into the receptacle only in a single fixed relative angular relationship. In this manner, each of the desired illustrated connections may be made to produce the desired power by merely selecting and inserting the proper connector cap.

In FIGS. 5–10 there is illustrated a prior art five-wire receptacle R of the interlocking type, a plurality of which may be used with this invention. The receptacle R includes a housing 42 of the nonconductive material defining a plurality of internal contact chambers 44, and a front face 46. The face 46 defines a centrally positioned circular grounding opening 48 and three arcuate slots 50a, 50b, 50c, all of which are equidistant from, and concentric with, the opening 48. Slots 50a, 50c are positioned directly opposite one another at the sides of face 46, as illustrated in FIG. 6. Directly opposite slot 50b at the top of the face 46, there is a further arcuate slot 52 which is also concentric with opening 48, but radially closer thereto than the slots 50a, b, and c. In addition, the end of slot 52 is extended radially to form an offset keyway 52'. Each of the recesses communicating with one of the slots 50a, b and c encloses a female electrical contact 54a, 54b, 54c. Contact 54a is connected by means of a conductive strap 56 to an external terminal binding screw 58. Contact 54b is connected by strap 60 to an external terminal binding screw 62. Contact 54c is connected by means of strap 64 to an external terminal binding screw 66. Mounted within the chamber 44 disposed behind slot 52 is a female contact 68 which is connected by means of a strap 70 to external terminal binding screw 72. The back of the housing 42 is closed by means of an insulating backplate 74 and a metallic strap 76 which extends along the rear of the backplate and includes a bent end portion 76' which extends over the top of the housing. Riveted against the strap 76 is the end of a grounding contact 78 which is mounted to accept a grounding pin inserted into opening 48. A terminal binding screw 80 is threadedly mounted in the end portion 76' of strap 76. The entire receptacle assembly is held together by means of bolts 82, which extend through receptacle mounting brackets 86, housing 42, backplate 74 and strap 76, and nuts 84. Although the receptacle of FIGS. 5–10 is a standard part of the prior art, it has been described in some detail herein because an understanding of its construction is necessary to an understanding of the present invention.

It is also important to understand the construction of the prior art connector cap $C_1$ illustrated in FIGS. 11–14. This connector cap is designed for use with the receptacle just described. It comprises a metallic shell 88 enclosing a body formed of a rear body disc 90 and a forward body disc 92, each disc formed from insulating material. The rear body disc 90 defines axial conductor passages 94 communicating with wiring chambers 96. Mounted on the front surface of the forward body disc 92 are three arcuate line contact blades 98a, 98b, 98c which are arranged to be inserted into the corresponding slots 50a, 50b, 50c of the receptacle R. A neutral contact blade 100 also extends from the forward body disc 92 and is concentric with the blades 98a, b, c but is positioned on a shorter radius. Accordingly, this blade is insertable into the slot 52 of the receptacle. A centrally positioned grounding pin 102 is riveted to a grounding strap 106 lying at the bottom of a radial recess 104 which extends along the face of forward body disc 92. The recess 104 deepens at its radially outer end to receive the head of a screw 108 which clamps the body portions together and threadedly engages an opening 110 formed in rear wall of shell 88. A similar screw 112 engages a threaded opening 114 formed in the shell rear wall to clamp together the diametrically opposite portion of the cap, shell and discs.

The connector cap $C_1$ includes terminals of the known solderless pressure type. The individual conductors of the electrical cable are led through conductor passages 94 and their stripped ends are laid in wiring chambers 96 adjacent serrated surfaces formed on the body disc 90 with the body disc 92 removed. Upon replacing forward body disc 92 and tightening screws 108, 112, the contact lug members 101 formed on the contact blades engage the stripped ends under pressure to complete the electrical connections to each of the blades.

It will now be seen that, if the cap $C_1$ of FIGS. 11–14 is inserted into the receptacle R of FIGS. 5–10, each of the line contact blades, 98a, b, c will enter the corresponding slots 50a, b, c; the contact blade 100 will enter the slot 52, and the grounding pin 102 will enter the opening 48. If female contacts 54a, b and c of the receptacle R are connected to the line conductors 16, 12, and 14, respectively, of the distribution system shown in FIG. 1; the female contact 68 is connected to the neutral conductor 18, and the grounding contact 78 to the grounding conductor 20, the resulting electrical power connection is that of cap $C_1$ of FIG. 1. In other words, the load to which the cap $C_1$ is connected will be connected to a 120/208 volts, three-phase four-wire circuit with a separate fifth wire equipment ground.

Assume that grounding pin 102 is removed from the connector cap shown in FIGS. 11–14 or, alternatively, that the cap is constructed without such a grounding pin, and as well as without the recess 104 and the grounding strap 106. If such a cap were inserted into the receptacle R of FIGS. 5–10, the resulting electrical power connection will be the same as that of the connector cap $C'_1$ of FIG. 1. A load connected to such a cap will be connected for powering by 120/208 volts, three-phase power, but without an equipment ground.

FIGS. 15 and 16 illustrate a connector cap $C'_5$ which is similar in many respects to connector cap $C_1$ and, accordingly, its construction is not shown in detail. However, it will be noted that, in connector cap $C'_5$ the blades 98a and 98c of connector cap $C_1$ have been omitted and the forward body disc 116 is slightly altered to provide a smooth surface at their former locations. It will also be noted that line blade 98b remains, as does a neutral blade 100' which is slightly altered from neutral blade 100 of cap $C_1$ by the provision of a thickened portion $100'_a$ formed by bending an extension of the blade back upon itself to form a key. The key $100'_a$ fits within the keyway 52' of the slot 52 in the receptacle. As the relative sizes and spacing of the two remaining blades are not altered, the cap $C'_5$ may still be inserted into the receptacle R, but connections will be made solely to the female contacts 54b and 68, which are connected to line and neutral conductors, respectively. Referring back to FIG. 1, it will be apparent that cap $C'_5$ will be connected so that a 120-volt single-phase load may be powered therefrom. In addition, it will be noted that the grounding pin 102 is shown in broken lines. This indicates that a grounding pin, similar to that of cap $C_1$, may be optionally provided on cap $C'_5$ for an equipment ground, resulting in the connection of cap $C_5$ of FIG. 1.

In FIGS. 17 and 18 there is illustrated a cap $C'_4$ which is a further modification of cap $C_1$. In this embodiment, the line blades 98a, 98c of cap $C_1$ are retained, but the blades 98b and 100 omitted, and the forward body disc 118 suitably altered. Inclusion of the grounding pin 102 is also optional, as with cap $C_5$, to form cap $C_4$. If cap $C'_4$ is inserted into receptacle R, the line blades 98a and 98c will make contact through female contacts 54a and c to two line conductors. This is illustrated in FIG. 1 as $C'_4$ and will allow a 208-volt single-phase load to be operated therefrom. Use of the grounding pin 102 will give the connection illustrated by a connector cap $C_4$ of FIG. 1.

FIGS. 19 and 20 illustrate a connector cap $C'_3$ having blades 98a, 98c, and 100' protruding from a forward body disc 120. When inserted into the receptacle R, it will make the connection illustrated in FIG. 1 as $C'_3$ so that a load requiring 120/208 volts single phase power with a grounded neutral can be powered. Inclusion of the grounding pin 102 would give the connection illustrated by connector cap $C_3$ of FIG. 1.

FIGS. 21 and 22 illustrate a connector cap $C'_2$, wherein the line blades 98a, 98b, and 98c protrude from the forward body disc 122. When inserted into receptacle R, the configuration illustrated by $C'_2$ in FIG. 1 results to provide 208 volts three-phase power. Inclusion of the grounding pin 102 results in the connection of cap $C_2$ of FIG. 1. In each of the embodiments shown in FIGS. 19–22, it will be further noted that the configuration varies from that of standard three-prong caps, not only in radial spacing, but further in that two of the three blades are directly opposed on a common diameter of the cap body.

It should be particularly noted that all of the power connections illustrated in FIG. 1 have been effected without disturbing the wiring of the receptacle R, but simply by selecting the proper connector cap, all of which are capable of being connected to the receptacle in a predetermined manner to effect the desired power connection.

In the description up to this point, reference has been had frequently to FIG. 1 which illustrates a four-wire power distribution system supplied by three Y-connected transformer secondaries with the addition of a separate equipment ground. However, the broader aspects of the invention are not limited to this type of distribution system, but are equally applicable to other multiple voltage systems. For example, there is illustrated in FIG. 2 a distribution system supplied from three delta connected transformer secondaries 124, 124'. Each secondary is rated at 220 volts and secondary 124' has a grounded midpoint. The conductors include the line conductors 12', 14', 16', a grounded neutral conductor 18', and a ground conductor 20'. The receptacle R previously described may be wired into such a system in the same manner as previously described and the caps $C_1$–$C_4$ may be inserted into the receptacle to make the connections illustrated in FIG. 2. However, the cap $C_5$ of FIG. 1 would not be employed in this arrangement, but in lieu thereof the cap $C'_6$ illustrated in FIGS. 2, 23 and 24. The cap $C'_6$ includes the blades 100' and 98a extending from its forward body disc 126. When employing the grounding pin 102, there would thus be provided the connection illustrated by connector cap $C_6$ of FIG. 2 and, without the grounding pin, the connection illustrated by cap $C'_6$ of FIG. 2. In either arrangement, the load connected to the cap would be supplied with 110 volts single-phase power, with an equipment ground when the ground pin 102 is employed.

The manner in which the invention may be applied to a 115/230-volt AC Edison system is illustrated in FIG. 4. It will be understood that, in each of the connector caps which have been described and which will be described below, the equipment grounding pin may be optionally either present or omitted. A prime (') attached to the identifying letter, illustrates that the optional grounding pin has been omitted. An AC Edison distribution system is a single phase AC system which is customarily fed from a center tapped transformer secondary 132. A separate grounding conductor 140 may also be supplied, as in the preceding wiring systems. 115 volts appears between the neutral conductor 134 and each of the line conductors 136, 138, and 230 volts appears across the line conductors 136, 138. A receptacle R, such as previously described, may be wired into the system so as to receive the connector caps $C_3$, $C_4$, $C_6$, and their corresponding equipment ungrounding versions, so that the various power connections illustrated in FIG. 3 can be achieved. It will also be apparent, however, that the lowermost slot 50b on the receptacle R is not employed in any of these versions. Accordingly, a receptacle may be utilized which omits this slot.

A further variation of the invention is illustrated in FIG. 4 as applied to a DC Edison system, wherein the generators 142, 144 supply a grounded neutral 146 and two line conductors 148, 150. The arrangement also includes a system equipment ground 152. The same receptacles and connector caps may be employed in this embodiment as that of FIG. 3 to achieve 115, 230, 115/230 volts, grounded or ungrounded power.

Figure 28:
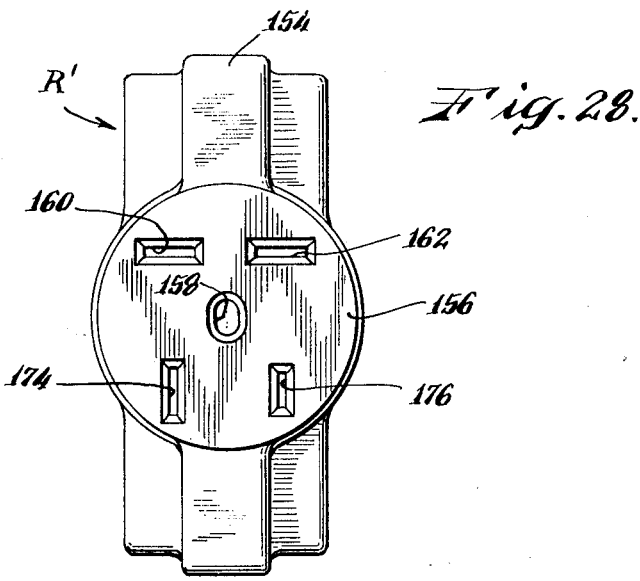
FIG. 28 is a front elevational view of a receptacle usable with the modifications of FIGS. 25, 26 and 27.
Figure 31:
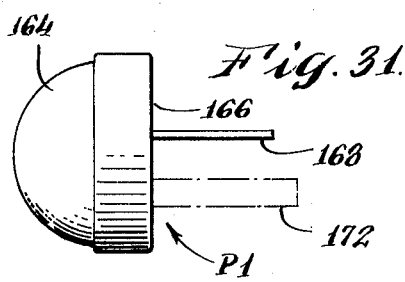
FIG. 31 is a side elevational view of a prior art connector cap usable with the receptacle of FIG. 28.
Figure 32:
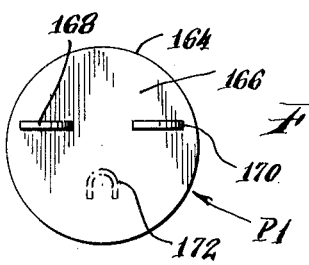
FIG. 32 is an end elevational of the cap of FIG. 31.

The principles of this invention are also applicable to use with connector caps of the straight-bladed type. In FIG. 25 there is illustrated a distribution system similar to that of FIG. 1, wherein similar reference numerals are used to designate similar elements. However, in this arrangement the receptacle R' illustrated in FIG. 28 is employed. The internal details of the receptacle construction are not illustrated as it is believed they would be obvious to one skilled in the art. Basically, the receptacle R' includes an insulating body member 154 having a face portion 156. The face portion defines a central, slightly oval, grounding opening 158. Above and to either side of the opening 158 are a pair of aligned slots 160, 162. The size and spacing of these slots in relation to the grounding opening 158 are such as to receive the standard 230-volt plug P1 illustrated in FIGS. 31, 32. Plug P1 includes a plug body 164 and end face 166. Projecting from face 166 is a pair of aligned blades 168, 170, and there may optionally be a U-shaped grounding pin 172.

The female contacts within the receptacle R' which communicate with the slots 160, 162 are normally connected to the higher voltage conductors of the distribution system. Thus, as connected in the system of FIG. 25, 208 volts would appear across the contacts associated with these slots, while the contact associated with the grounding opening 158 would be connected to the system equipment ground conductor 20.

Figure 33:
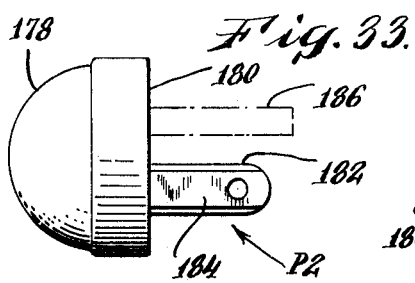
FIG. 33 is a side elevational view of another prior art conector cap usable with the receptacle of FIG. 28.
Figure 34:
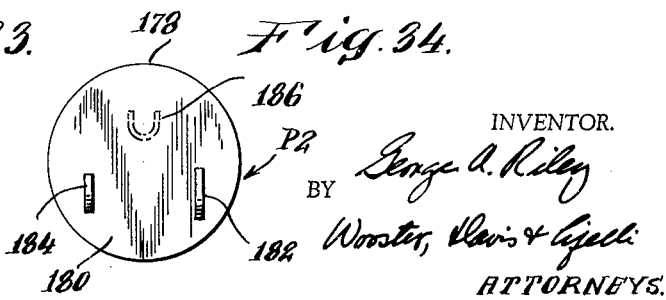
FIG. 34 is an end elevational view of the cap of FIG. 33.

The face 156 of receptacle R' also defines a pair of lower parallel slots 174, 176 which are spaced relative to one another and to grounding opening 158 to receive the standard plug P2 illustrated in FIGS. 33 and 34. Plug P2 is the well known 120-volt plug having a body 178, an end face 180, parallel contact blades 182, 184, and an optional grounding pin 186. It will be noted that the blades 182, 184 are polarized, as is customary in attachment plugs of this type, blade 182 being wider than blade 184; to accommodate blade 182, the corresponding slot 174 in the receptacle is wider than slot 176. When the receptacle R' is wired into the system, the female contact associated with slot 176 is connected to the grounded neutral 18, while the contact associated with slot 174 is connected to the remaining line conductor.

Figure 29:
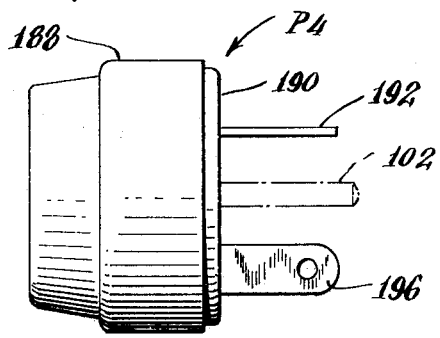
FIG. 29 is a side elevational view of a connector cap for use with the receptacle of FIG. 28.
Figure 30:
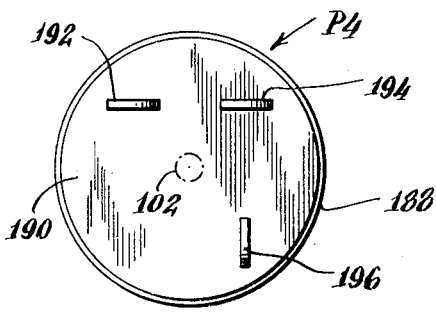
FIG. 30 is an end elevational view of the cap of FIG. 29.

Various combinations of wiring connections corresponding to those shown in FIG. 1 can be achieved using straight-bladed devices. For example, a three-bladed plug P3 as shown in FIG. 25, can receive 120/208 volts power. A three-bladed plug P4 having the two top blades but a different lower blade may receive three-phase 208 volts power. Plug P4 is illustrated in some detail in FIGS. 29 and 30, and it includes a plug body 188 having an end face 190 from which project the aligned blades 192, 194 and one of the lower parallel blades 196. The fifth electrical connection which would supply a four- or five-wire grounded neutral load is illustrated as P5 in FIG. 25.

Figure 26:
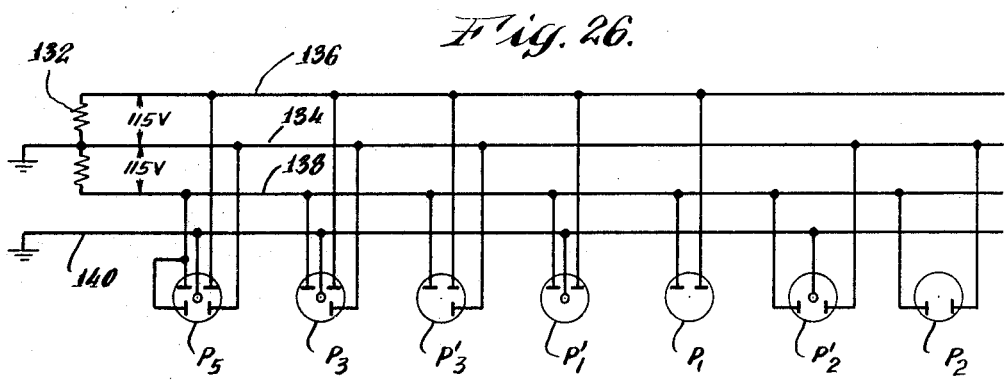
FIG. 26 is a schematic diagram of a single-phase 4-wire AC Edison wiring system embodying a modification of this invention.
Figure 27:
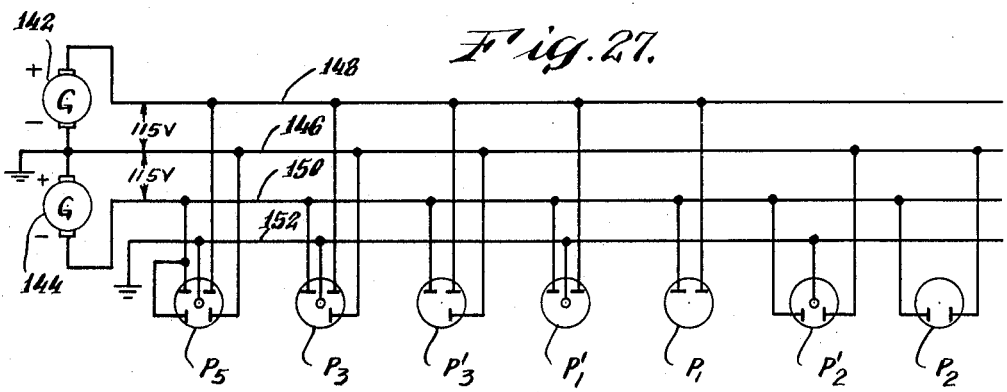
FIG. 27 is a schematic diagram of a four-wire DC Edison wiring system embodying a modification of this system.

The manner in which the plugs of FIG. 25 may be applied to receptacles wired into a single-phase AC Edison system is illustrated in FIG. 26 and their application to a DC Edison system in FIG. 27.

The many advantages produced by this invention will be fully apparent to those skilled in the art. It will also be apparent that a number of variations or modifications may be made therein without departing from its spirit and scope. Accordingly, the foregoing construction is to be construed as illustrative only, rather than limiting. The invention is limited only by the scope of the following claims.

What I claim as new and desire to secure by Letters Patent of the United States is:

1. A multiple voltage electrical power distribution wiring system which comprises: a plurality of substantially identical receptacles, each having a plurality of first contacts, substantially similarly wired to a common multiple voltage electrical power supply; and a plurality of mating caps, each cap being connectable to each of said receptacles in a fixed relative angular relationship, said caps having differing numbers and dispositions of second contacts arranged for engagement with said first contacts automatically to extract therefrom power at different preselected voltages.

2. The system of claim 1 wherein each of said receptacles defines a plurality of blade-receiving openings communicating with said first contacts; said openings are nonsymmetrically arranged, and each of said caps is connectable in a single preselected orientation relative to its associated receptacle determined by the number and arrangement of said second contacts.

3. The system of claim 1 wherein said supply comprises at least three current carrying conductors and each of said first contacts is connected to a different one of said conductors.

4. The system of claim 1 wherein said supply comprises at least four current carrying conductors and each of said first contacts is connected to a different one of said conductors.

5. A multiple voltage electrical power distribution wiring system which comprises: a plurality of substantially identical receptacles, each enclosing a plurality of electrical contacts therein and having a face portion defining a plurality of concentric arcuate slots, each communicating with a different one of said contacts, at least one of said slots being located on a different circumference from the remaining slots, each of said contacts being connected to a different electrical power supply conductor of said wiring system; and a plurality of mating caps, each of said caps being connectable to each of said receptacles and having a different plural number and disposition of curved blades, each blade being insertable into a different one of said slots to engage one of said contacts.

6. The system of claim 5 wherein said multiple voltages are derived from a four wire, Y-connected supply.

7. The system of claim 5 wherein said multiple voltages are derived from a four wire, delta connected supply.

8. The system of claim 5 wherein said multiple voltages are derived from a three wire A.C. Edison supply.

9. The system of claim 5 wherein said mutiple voltages are derived from a three wire D.C. Edison supply.

10. The system of claim 5 wherein said receptacle further encloses an equipment grounding contact; said face defines a grounding opening communicating therewith; and said cap includes a grounding pin insertable into said grounding opening to mate with said grounding contact.

11. A three-blade rotatably locking electrical connector cap wherein at least two of the blades are oppositely disposed along a common diameter of the cap.

12. A multiple voltage electrical power distribution wiring system which comprises: a plurality of substantially identical receptacles, each enclosing first, second, third, and fourth electrical contacts and having a face portion defining first and second aligned straight slots communicating, respectively, with said first and second contacts and adapted to receive a standard in-line straight bladed plug and third and fourth parallel straight slots communicating, respectively, with said third and fourth contacts and adapted to receive a standard parallel straight bladed plug; and a plurality of mating plugs, each of said plugs having a different plural number and disposition of straight blades, each blade being insertable into a different one of said slots to engage one of said contacts.

13. For use with a receptacle including four receptacle contacts accessible through four slots concentrically disposed in the front wall of the receptacle body and angularly equally spaced, a connector plug having fewer contact blades than and insertable into the receptacle contacts.

14. The cap of claim 13 having three contact blades, two of which are diametrically aligned.

References Cited
UNITED STATES PATENTS 2,930,019  3/1960  Hubbell _____ 339—31

ORIS L. RADER, Primary Examiner

W. E. DUNCANSON, Jr., Assistant Examiner

U.S. Cl. X.R.

307—42; 339—32